United States Patent [19]

Lori

[11] Patent Number: 4,901,632
[45] Date of Patent: Feb. 20, 1990

[54] THREE-PHASE PROCESS AND MACHINE FOR COOKING FOODS AS DRY PASTA, RICE, LEGUMES AND THE LIKE

[76] Inventor: Giulio Lori, Via Lambruschini, 4, Terni, Italy

[21] Appl. No.: 126,188

[22] Filed: Nov. 27, 1987

[51] Int. Cl.⁴ ............................................. A47J 44/00
[52] U.S. Cl. ....................................... 99/339; 99/403; 99/407; 99/348; 99/409
[58] Field of Search ................ 99/339, 348, 403, 407, 99/409, 444; 252/180, 181; 126/5; 210/222

[56] References Cited

U.S. PATENT DOCUMENTS

| | | | |
|---|---|---|---|
| 3,597,228 | 8/1971 | Jeppson et al. | 99/339 X |
| 3,608,473 | 9/1971 | Kearn | 99/407 X |
| 3,635,148 | 1/1972 | Fenerli | 99/407 X |
| 4,167,480 | 9/1979 | Mach | 210/222 X |
| 4,422,934 | 12/1983 | Debney et al. | 210/222 |
| 4,428,837 | 1/1984 | Kronenberg | 210/222 |
| 4,543,878 | 10/1985 | Luchetti | 99/407 X |
| 4,552,664 | 11/1985 | Benner | 210/222 X |
| 4,718,331 | 1/1988 | Ansaloni et al. | 99/407 X |
| 4,732,080 | 3/1988 | Vita | 99/407 X |
| 4,748,902 | 6/1988 | Maurantonio | 99/407 X |

FOREIGN PATENT DOCUMENTS

| | | | |
|---|---|---|---|
| 2205284 | 8/1973 | Fed. Rep. of Germany | 99/348 |
| 181112 | 10/1984 | Japan | 99/403 |

*Primary Examiner*—Jimmy G. Foster
*Assistant Examiner*—Christine A. Peterson
*Attorney, Agent, or Firm*—Steinberg & Raskin

[57] ABSTRACT

The invention relates to a new process for the quick cooking of foods such as pasta, rice, legumes and the like, and the automatic machine to carry it out.

The process comprises three phases, namely pre-cooking, cooking and final cooking starting with overheated water. The process and the machine allow reduction of cooking time, improving efficiency of cooking level, avoiding excess of water hardness, reducing power consumption, avoiding or reducing scales, simplifying the machine and extending its life, having different types of heating, according to the local availability, and keeping comfortable the surrounding room where the machine has been installed.

29 Claims, 2 Drawing Sheets

THREE-PHASE PROCESS AND MACHINE FOR COOKING FOODS AS DRY PASTA, RICE, LEGUMES AND THE LIKE

BACKGROUND OF THE INVENTION

It is known that for obtaining a rapid cooking of dry foods it is necessary, for a short time, pre-cook in over-heated water and then cook by condensation vapour. The present invention relates to a new contemporary cooking method of dry foods to eat immediately, according to a three-phases cycle:

(1) pre-cooking phase in overheated water at high temperature and pressure (160°–200° C. at 8–18 bar);

(2) cooking phase by water and vapour at lower temperature and pressure (80°–160° C. at 1.5–5 bar); and (3) final cooking at atmospheric pressure with mixing the cooked food, draining and adding of seasoning if requested. The machine according to the invention can have two cooking lines, feeded by one boiler, for the three-phases cycle.

On a continuous request of cooked food the time is reduced of ⅓ at least; in fact food can be at the same time in precooking, cooking and final cooking cycles. The machine comprises: (see FIG. 1) two or more dispensers (A) for the dry food ; pre-cooking chambers (C) fitted in the generator of overheated water; cooking chambers (G) with expeller pipe; final chambers (J) with spherical valve (L); gas heating devices; exhausted vapour chimney; salt regulation inside the boiler and anti-scales device for the water. The known machines cannot produce an accpetable cooking because:

(1) It is difficult to find power supplies to fulfill the high need of power requested by the machine, when working at cycles of 60 sec;

(2) It is necessary to remove scales in the heating element of boiler;

(3) There is not the control of mineral salt increase in the sevice water:

(4) There is a blast of power during each cycle because of the water thermal expansion causing the safety values opening and water overflowing;

(5) Difficulties for obtaining a constant temperature in the pre-cooking chamber after inactivity are encountered; and (6) Room moisture comes out after few cycles because of the vapour.

SUMMARY OF THE INVENTION

The purpose of the invention is to carry out a machine that, with a proper process, by starting a push-button, or by introducing coins, gives automatically a portion of cooked pasta, rice and legumes under hygienic conditions while keeping the quality of the same food.

. The machine can work automatically like the distributor of drinks and foodstuffs and can be installed in self service areas at low cost.

All the materials that are in contact with food are approved by all European and American rules; besides an automatic device gives hygienic process by washing with water and vapour to remove residual food.

The machine properly works also after a period of inactivity; the devices are easy to run and test without any special maintenance.

The process is carried out in three phases: At first, the dry food is pre-cooled in over-heated water until it becomes soft, then, the food and water are poured off in a chamber for the cooking, while pressure is reduced to the water condensation temperature; finally, food and water come in the chamber where they are mixed, released of water, seasoned on request, and put over a plate. The machine can have two or more cooking lines for allowing feeding of different foods. The following is a detailed description of a machine having two cooking lines, both feeded by one dispenser. The machine comprises:

(a) two dispensers for dry foods, connected in cascade by spherical valves (B) with pre-cooking chambers.

The dispenser can vary according to the kind food: one type has been designed to put in dry and long pasta in fixed and adjustable quantity.

From a storage hopper the food goes down through a bottleneck, comprising two inclined planes put in front each other, in a cylinder splitted in four cells.

The cells are formed by splitting the cylinder in four parts by orthogonal planes passing through the axis of the cyclinder. The cylinder, motor driven, gives a dose when rotated 90 degrees from its axis;

(b) an over-heated water generator, or boiler, which is vertically crossed by two pre-cooking chambers where the food is in bain-marie at the pressure and temperature of generator. The insertion in the boiler of the pre-cooking chambers prevents them from becoming cold when the machine is not working and the greater thermal capacity of the generator improves temperature uniformity in the above mentioned chambers.

The boiler comprises a vertical cylinder wherein a pipe beam is provided, that is crossed by hot fumes of a gas flame combustion.

When power supply outlets are present, the pipe beam can be replaced by an electric resistance.

The cylindrical body comprises two or more horizontal parts (both having a pre-cooking chamber) interconnected with each other and with the container;

(c) two cooking chambers both connected with the bottom of the pre-cooking chambers by a second spherical valve (F). The cooking chambers have double capacity if compared with the pre-cooking chambers, because of the presence of a pipe for pressurized vapour (expeller pipe).

In the bottom of the chamber the cooking of food continues that, stopped by a third spherical valve (H), stores in the bottom condensation water.

On the outer part of this side of chamber there is a jacket for recovering heat, which is given to the service cold water of boiler.

(d) two final chambers bigger than previous, connected by the third interdiction device with the lower end of the cooking chambers.

Such chambers, of cylindrical shape, vertically placed for better pick-up and condensing a portion of vapour from the cooking water, are connected with the by-pass of the combustion products of boiler.

The vapours in excess not condensed come through the by-pass to the outside to avoid entering in the surrounding room. The bottom of the final chamber is closed by a semi-spherical valve, avoiding direct connection with the room. The valve is fitted with a strainer and a double bottom in which the drained water is contained.

When the valve overturns, the food inside the drain falls into a plate, while the cooking water remains in the double bottom.

Through a by-pass, provided in the valve axis, the cooking water exits and discharges into the sewer.

(e) two sauce mixers connected with the inner of the final chamber and a space portion to the food after draining.

(f) an anti-calcareous treatment device for the boiler service water to avoid hard scales of the heating elements.

The scales have a low heat transmission and consequently the surface temperature increases; the breaking of a layer of scale produces a contact between water and over-heated surface and an overpressure that can cause the explosion of boiler. To avoid scales a physical treatment is used instead of chemical.

By physical treatment the water flows through magnetic fields that affect ions dipolar moment; water chemical composition and drinking are not changed, but only modified salts are generated that remain suspended and are no more able to make scales.

The sediments are easily eliminated with water.

(g) a device allowing a continuous control of salts concentration in the boiler.

The water leaves an amount of mineral salt in the boiler, that prevents heat exchange.

Two electrodes immersed in the water of the boiler check the salts concentration.

A control device operates a drainage electrovalve to open it when the fixed limits are overcome, discharging the excess of salts using a minimum quantity of water.

(h) a programmable logic controller PLC, for operating the machine.

The controller comprises a feeder, a central program unit (cpu), input/output modules, timers and programming keyboard. The programming is carried out by using contacts plan and is pre-recorded.

Different programs are available according to the type of feeding.

BRIEF DESCRIPTION OF THE DRAWINGS

The enclosed drawings 1 and 2 show an embodiment of the machine.

DESCRIPTION OF THE PREFERRED EMBODIMENTS

Figure 1:
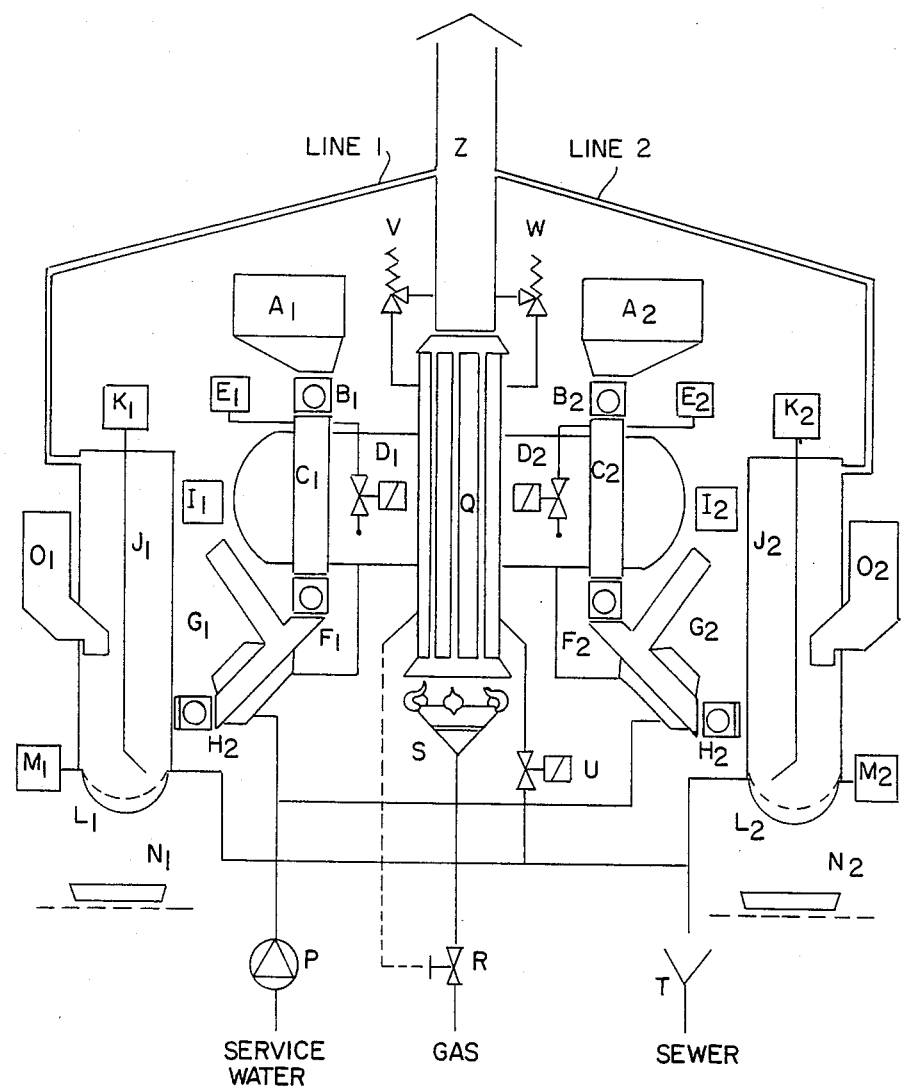
Figure 2:
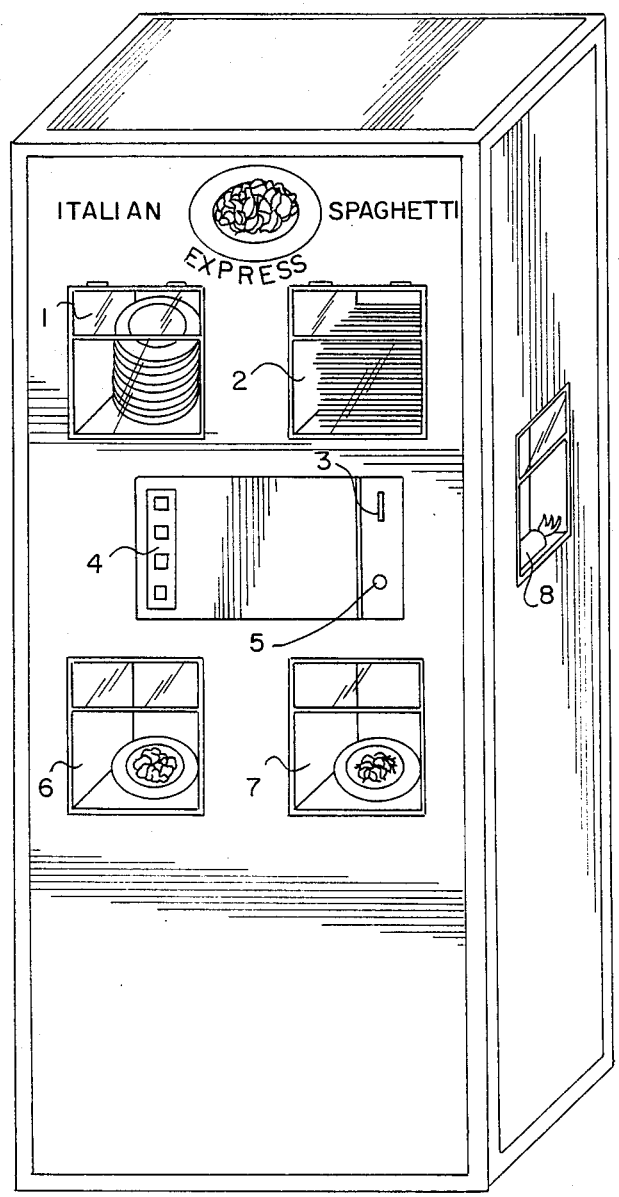

FIG. 1 shows the internal devices while FIG. 2 shows the outside shape. The present invention is directed to a three-phase process for the cooking of foods such as dry pasta, legumes and the like, in which the food is placed in a first chamber with over-heated water and high temperature and pressure, then in a second chamber with water and vapor at medium temperature and pressure, and finally in a third final chamber at 80° C. temperature and atmospheric pressure, where the food is completely cooked, seasoned, and placed over a plate, while residual water is removed. The cooking cycle takes place in three phases.

The present invention is also directed to an automatic machine for carrying out the cooking process in three phases, which comprises the following features:

Dispensors (A) having outputs connected to pre-cooking chambers;

Pre-cooking chambers (C) having inlet valves (B) and outlet valves (F);

Cooking chambers (G) having inlet valves (F) and outlet valves (H) and provided with a cooling jacket and an expeller pipe for vapor;

Final chambers (J) provided with semispherical valves (C) with a strainer with an under-bottom for picking and elimination of cooking water;

Seasoning dispensers (O) with nozzles for discharging directly into the final chambers (J) upon the cooked food;

A boiler (Q) for producing overheated water;

Anti-scale treating devices of the water from the boiler;

An electrometer device for the continuous control of salt concentration in the boiler;

Water feeding pump in the boiler;

Main burner for heating the boiler and a safety pilot burner;

gas valve for the control of temperature in the boiler;

electric board for programming of PLC logic for the operating control of cycles; and Group of devices, pump, safety valves, electrovalves, limit switches, pressure switches, thermostats, control and measurement instruments, including connection fittings. Preferably, up to six lines are provided with simultaneous operation.

Below the operating of one cooking line is described, being the same as the second line. Start-up of machine depends on rating of boiler temperature.

After start-up—monitored by a lamp—one line is selected; the cycle can start by pushing the start-button or introducing a coin.

The dispenser (A) delivers a portion of food that goes through the valve (B) and into the below pre-cooking chamber (C). After closure of the valve (B), overheated water is introduced through the electrovalve (D) into the chamber. The boiler pressure goes down; the pump (P) starts working for increasing again the pressure in the boiler (Q) then in the chamber (C) to a value set by the pressure switch (E). Inside the chamber (C) the temperature and pressure conditions are 160°-200° C. and 8-18 bar. The pre-cooking is preferable carried out at a 160°-200° C. temperature and 8-18 bar pressure.

Elapsed the time t1 and ended the pre-cooking phase, the spherical valve (F) opens.

Because of the pressure existing in the pre-cooking chamber (C) the food and over-heated water go into the cooking chamber (G). The cooking is carried out at a 80°-160° C. temperature and 1.5-5 bar pressure.

In this moment the two chambers are interconnected: the volumes add and the pressure goes to 5 bar.

The valve (F) closes and the food stays in the chamber (G) cooking in water which starting temperature of 160°-200° C. goes down to 80° C., as measured by the thermostat (I).

The temperature decrease in the chamber (G) is accelerated by a cooling jacket that recovers heat (given the cooling water of the boiler).

Consequently the pressure decreases; in the expeller pipe of chamber (G) there remains a quantity of vapour at 1,5-2 bar pressure.

Under this pressure, when the spherical valve (H) opens, the food and the remaining cooking water of chamber (G) go in a final chamber (J) at atmospheric pressure: food is then picked up in the semi-spherical valve (L).

As the food goes out at a temperature of 80° C. the remaining vapour is reduced, being condensed in the chamber (G). The remaining vapour goes out through the chimney (Z). Valve (H) closes and the mass of food in the strainer (L) completes the cooking; meanwhile the mixer (K) starts and the remaining water stays under-bottom.

On request, cold water can be sprayed for stopping the cooking. After a time t2 the dispenser (O) adds a portion of sauce to the food.

The semispherical valve (L) upsets the seasoned food over a plate (N) enclosed in an openable chamber and simultaneously emptying of cooking water from the double bottom happens. By washing the strainer with boiling water and emptying of washing water the cycle ends.

For starting a new cycle, push again the operating button. The machine can deliver continuously portions of food: in this case the time-cycle is reduced by ⅓ because the three chambers can work at the same time.

All the compartments are provided with opening plexiglass screen for taking plates with cooked food and feeding plates and food if necessary.

By way of example, the following data are furnished, relating to a machine according to the invention:
 Net weight: 100 kg.
 Cooking time: less than 60 sec.
 Capacity: 120 plates/hour.
 Portion per plate: 120 gr.
 Electric power: 110–220 V.—service water—gas signalling lamp for exhaust food.

Numbers indicated in FIG. 2 refer to:
1-PLASTIC PLATES
2-DRY SPAGHETTI (FOOD)
3-SLOT COINS
4-CONTROL BOARD FOR STARTING COOKING
5-WARNING LIGHT
6-7—PLATES WITH COOKED SPAGHETTI (FOOD)
8-CUTLERY The machine as described is easy to manage and to operate. The cooking is carried out at a 80°–160° C. temperature and 1.5–5 bar pressure.

The cycle is preferably carried out at a 65°–200° C. temperature and 0–18 bar pressure. The final cooking is preferably carried out at a 65°–100° C. temperature and at atmospheric pressure. The start flow process is overheated water.

The boiler preferably comprises a cylindrical body crossed by a pipe beam heated by combustion products of a flame with gas (methane, propane, LPG). The boiler may also comprise a central cylindrical body heated by an electric resistance. The boiler itself is preferably composed by horizontal connected modules, each containing a pre-cooking chamber. The pre-cooking chambers preferably operate in bain-marie. The pre-cooking chambers may be dipped in the boiler itself. In particular, the pre-cooking chambers give stable and uniform temperature, and produce uniform treatment also after inactivity of the machine itself.

Service water, before entering into the boiler, is preferably subjected to physical treatment consisting of applying magnetic fields to avoid forming hard scales on the heating elements. In particular, the growing salt heap in a boiler is continuously checked by a device (electrode and electrovalve) that discharges the mineral salt excess contained in the water. Each chamber (G) has an expeller pipe in which vapor, because of opening of the valves (H), carried out the function of emptying the chamber (G). The cooking chamber (G) is fitted with a jacket for heat recovery, transferred to the cold service water for the boiler.

The final chamber (J) is fitted with a semi-spherical valve (L) that closes the bottom of the final chamber (J). This valve (L), in turn, contains a semi-spherical and perforated strainer and a chamber for picking or retention of cooking water which, when upset, allows the food to fall upon a plate, and the flow of the cooking water along a perforated axis of the same valve.

A seasoning dispenser (O) is placed at the same side of the final chamber (J) and is connected to the same chamber for admitting the seasoning in the draining food.

The dispenser (A) for dry foods, connected with the pre-cooking chambers (C), comprises a hopper where the dry food is stored, with discharge therefrom being carried out along two inclined planes placed in front of one another forming a bottle-neck through which the food drops down into one of four dispenser spaces in a cylinder that is cross-split along an axis thereof. This cross-splitting is motor driven which turns inside a cylindrical chamber thus causing the discharging of a portion of the dry food from the four portion total at a time.

The treatment of the cooking phases on both lines as illustrated in FIG. 1, is preferably controlled by PLC (Programmable logic controller).

I claim:

1. Automatic machine for carrying out a cooking operation in three phases, having a line comprising
    a pre-cooking chamber for performing a first of said three phases, comprising an inlet and an outlet,
    a first valve disposed in said pre-cooking chamber inlet, and a second valve disposed in said pre-cooking chamber outlet,
    a dispenser coupled to said pre-cooking chamber inlet in a manner such that feed in said dispenser cascades into said pre-cooking chamber when said first valve is open,
    a cooking chamber for performing a second of said three phases, having an inlet coupled to said outlet of said pre-cooking chamber and an outlet in a bottom thereof, with a third valve disposed in said cooking chamber outlet,
    a cooling jacket surrounding at least a part of said cooking chamber,
    an expeller pipe communicating with an interior of said cooking chamber for releasing pressurized vapor therefrom,
    a final cooking chamber for performing a third of said three phases, having a inlet coupled to said outlet of said cooking chamber through said third valve, being substantially cylindrical in shape and vertically positioned with a fourth valve closing a bottom thereof, avoiding direct connection with a surrounding area, and
    a boiler for generating over heating water for said cooking operation.

2. The combination of claim 1, additionally comprising a fifth valve through which said boiler communicates with said interior of said cooking chamber.

3. The combination of claim 1, wherein said pre-cooking, cooking, and final cooking chambers are arranged such that the feed falls from one chamber to the next when the respective valve is opened.

4. The combination of claim 1, comprising two separate lines, each line comprising its own respective pre-cooking, cooking, and final cooking chambers each communicating with one another, and with said boiler arranged to feed water to both said cooking chambers of said two lines.

5. The combination of claim 1, wherein all said valves are spherical.

6. The combination of claim 1, wherein said cooking chamber has a greater capacity than said pre-cooking chamber.

7. The combination of claim 1, wherein said final cooking chamber has a greater capacity than said cooking chamber.

8. The combination of claim 2, wherein said final cooking chamber is coupled to a flue duct of said boiler for combustion products of said boiler, whereby said excess vapor is conveyed from said final cooking chamber to avoid contamination in the surrounding area.

9. The combination of claim 4, comprising up to six of said separate lines.

10. The combination of claim 1, wherein said boiler comprises a central cylindrical body crossed by a pipe beam, heated by combustion products of a flame of gas.

11. The combination of claim 10, wherein said gas includes methane, propane, LPG.

12. The combination of claim 1, wherein said boiler comprises a central cylindrical body heated by an electrical resistance.

13. The combination of claim 10, wherein said boiler additionally comprises two horizontal parts interconnected with said central cylindrical body and each part containing a pre-cooking chamber.

14. The combination of claim 13, wherein each said pre-cooking chamber is dipped in said boiler.

15. The combination of claim 14, wherein said two pre-cooking chambers are arranged to exhibit stable and uniform temperature.

16. The combination of claim 15, wherein said pre-cooking chambers additionally produce uniform treatment even after activation in activation of said machine.

17. The combination of claim 1, additionally comprising means for subjecting service water to a physical treatment of applying magnetic field before the service water is introduced into the boiler, to avoid forming hard scales on heating elements within the boiler.

18. The combination of claim 1, additionally comprising means for continuously checking growing salt heap in said boiler comprising an electrode device connected by a control unit with an electrode valve, which remove mineral salt excess by discharging a minimum quantity of water.

19. The combination of claim 1, wherein said expeller pipe of said cooking chamber is arranged to empty said chamber of vapor when said third valve is opened.

20. The combination of claim 1, wherein said cooling jacket is arranged to transfer heat recovered from said cookingn chamber to service water entering said boiler.

21. The combination of claim 1, wherein said fourth valve contains a semispherical and perforated strainer and a double bottom for retention of water which, when upset, allows food contained in said strainer to fall thereoff while the water remains in said double bottom, and additionally comprising a duct communicating with said double bottom along an axis of said fourth valve for discharging the water to a sewer.

22. The combination of claim 1, additionally comprising a seasoning dispenser conntected to said final cooking chamber for introducing the seasoning for foods.

23. The combination of claim 1, wherein said dispenser comprises a hopper and a cylinder divided into four portions by cross-dividing the same along an axis thereof, said hopper arranged to discharge food into one of said four portions which are rotated by said crosssplitting being motor driven to turn inside said cylinder, whereby a portion at a time is discharged of the four portions of dry food.

24. The combination of claim 4, wherein said cooking phases of both said lines are controlled by a PLC (programmable logic controller).

25. The combination of claim 1, wherein said precooking chamber is arranged to provide a pressure of about 8–18 bar and a temperature of about 160°–200° C. therein.

26. The combination of claim 1, wherein said cooking chamber is arranged to provide a pressure of about 1.5–5 bar and a temperature of about 80°–160° C. therein.

27. The combination of claim 1, wherein said final cooking chamber is arranged to provide a temperature of about 65°–100° C. therewithin.

28. The combination of claim 1, wherein said chambers and boilers are all arranged to provide an overall operating temperature of about 65°–200° C. and pressure of about 0–18 bar.

29. The combination of claim 13, wherein each said pre-cooling chamber is situated to operate in a water bath.

* * * * *